(No Model.) 3 Sheets—Sheet 1.
P. WEBER.
FRICTION CLUTCH.

No. 505,970. Patented Oct. 3, 1893.

Witnesses:
Inventor:
Peter Weber
By Philipp Munson & Phelps
Attys (No Model.) 3 Sheets—Sheet 2.
P. WEBER.
FRICTION CLUTCH.
No. 505,970. Patented Oct. 3, 1893.
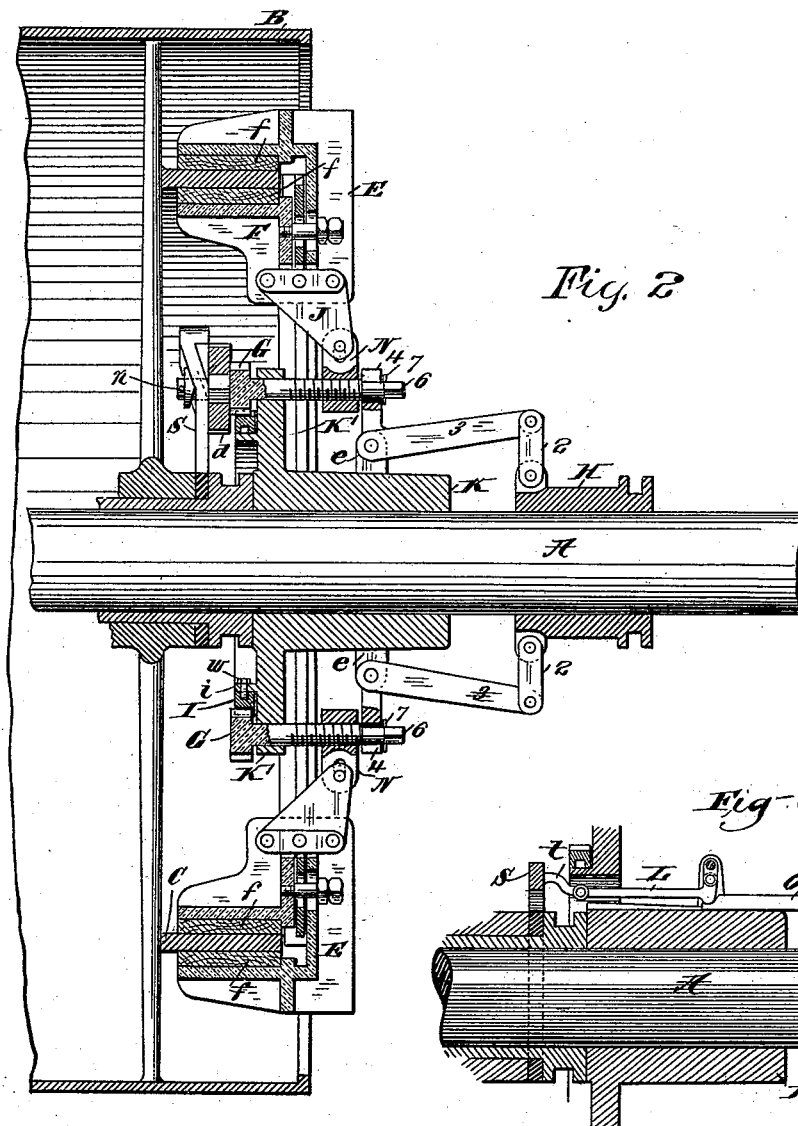
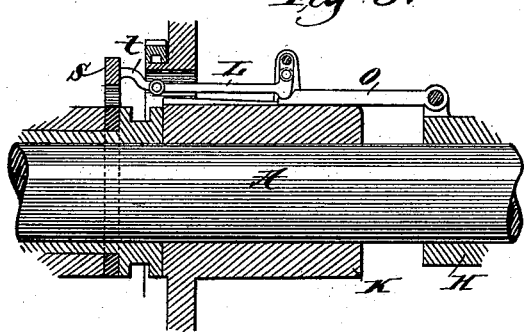
Witnesses:
D. W. Gardner
J. J. Kennedy
Inventor:
Peter Weber
By Philipp Munson & Phelps
Attys

UNITED STATES PATENT OFFICE.

PETER WEBER, OF SCHENECTADY, NEW YORK.

FRICTION-CLUTCH.

SPECIFICATION forming part of Letters Patent No. 505,970, dated October 3, 1893.

Application filed May 2, 1892. Serial No. 431,562. (No model.)

*To all whom it may concern:*

Be it known that I, PETER WEBER, a citizen of the United States, residing at Schenectady, county of Schenectady, and State of New York, have invented certain new and useful Improvements in Friction-Clutches, fully described and represented in the following specification and the accompanying drawings, forming a part of the same.

This invention relates to improvements in friction clutches.

In two Letters Patent granted to me September 13 and September 27, 1892, numbered respectively 482,491 and 483,370, I have shown and described tightening and adjusting mechanisms (as they are termed therein) for friction clutches, which are operated automatically when the speed of the driven member is less than that of the driving member to increase the friction between the two members of the clutch, the adjusting mechanism being also operated by hand, independently of the tightening mechanism, to adjust the two members to and from each other for desired degrees of initial friction upon the operation of the clamping mechanism of the clutch. In said two patents these two mechanisms have been shown and described only in connection with clutches of the class known as "disk" clutches, *i. e.* clutches the contacting portions whereof move longitudinally of the axis of the clutch to and from clutching positions. In the present application, however, these two mechanisms are applied to clutches of that class in which friction devices, such as "shoes" or "segments" are employed which move radially of the clutch to and from clutching position.

The present invention though included broadly as to these two mechanisms in said patents consists in certain improvements upon the tightening and adjusting mechanisms and in the connections between the latter and the friction mechanism of the clutch having for their object particularly the adaptation of these two mechanisms to employment in shoe or segment clutches.

The invention also consists in certain other improvements which will be hereinafter referred to.

Figure 1:
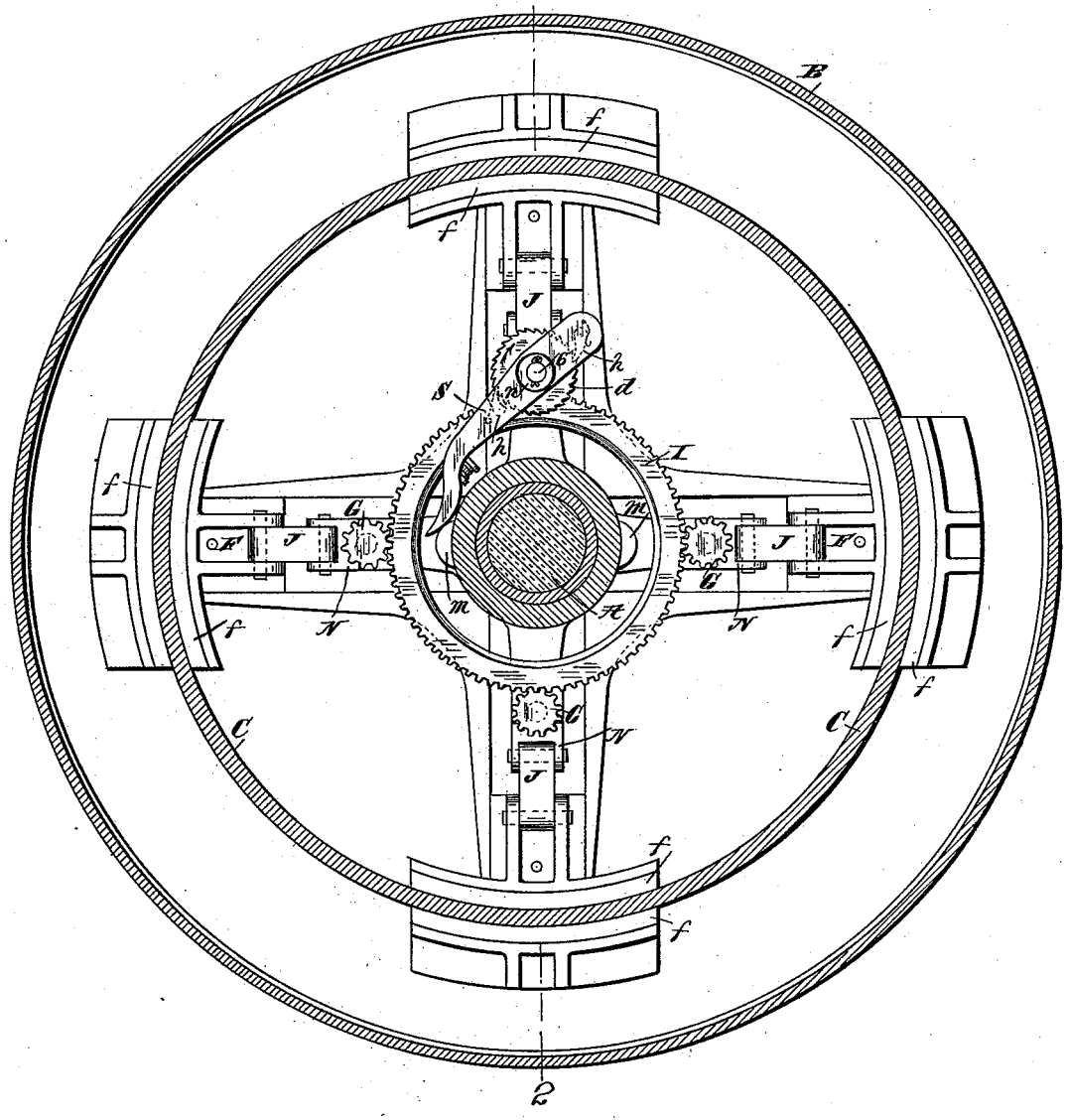
Figure 4:
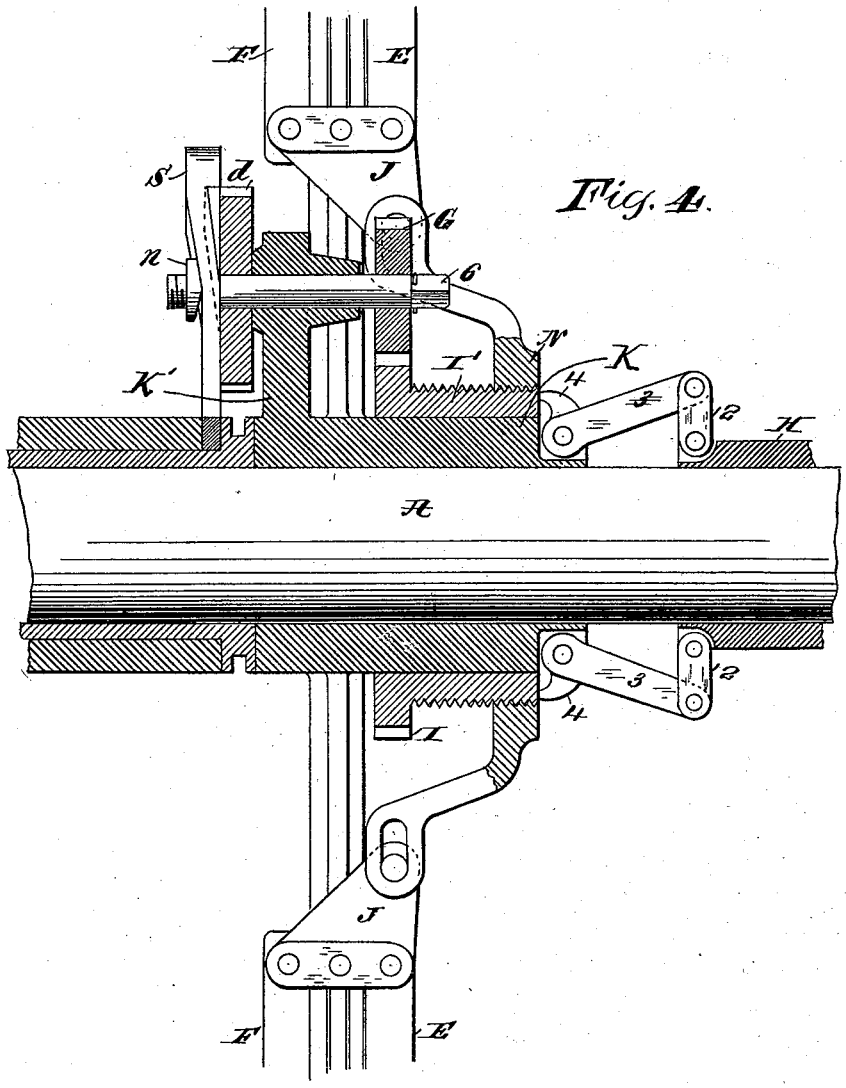

In the accompanying drawings, Figure 1 is a rear view of a clutch of familiar form, so far as its friction shoes or segments and the clamping mechanism for operating the latter are concerned. Fig. 2 is a section on about the line 2 of Fig. 1. Fig. 3 is a detail illustrating particularly the construction of mechanism for adjusting the tightening mechanism to and out of operative position. Fig. 4 is a modification which will be hereinafter referred to.

Referring to Figs. 1 and 2, A represents a shaft to be driven (though it may be a driving shaft) and B a driving pulley loosely mounted thereon. The shaft A has keyed or otherwise fixed to it a sleeve K which carries the friction devices, their operating mechanism, the adjusting mechanism and the tightening mechanism. To this sleeve is also connected the shifting mechanism for moving the operating mechanism of the friction devices to clamping or clutching position. These different mechanisms will be described in the order in which they are above referred to.

The friction devices consist of shoes or segments E, F mounted so as to move radially of the clutch in arms or ribs projecting from the sleeve K. In clamping the shoes or segments E, F engage a flange C formed upon the pulley B. The mechanism for operating these friction shoes or segments consists of nuts N (one for each pair of shoes or segments) which are movable longitudinally of the axis of the clutch or in other words transversely to the shoes or segments E, F. This operating mechanism may be supported in any suitable manner from the sleeve K but as shown the nuts N are each connected to a shaft 6 journaled, so as to be capable of both longitudinal and rotary movements, in a flange K' upon sleeve K; these shafts 6 forming part of the adjusting mechanism which will be hereinafter described. In addition to this movement with the shafts 6 longitudinally of the axis of the clutch in clamping, the nuts N have also a movement upon said shafts to and from flange K' in tightening, as will hereinafter appear. The nuts N are connected to the shoes or segments E, F by bell crank lever J.

The mechanism for shifting the nuts N to position for operating the shoes to clamp the flange C consists of a series of bell crank levers 3 (one for each nut and shaft 6) fulcrumed in lugs e formed on sleeve K and a sleeve H movable longitudinally on shaft A, to which sleeve the bell crank levers 3 are connected by links 2. The short arm 4 of each of the levers 3 is bifurcated and straddles an extension of one of the shafts 6 outside the nut N. These extensions of the shafts straddled by the arms 4 are provided with pins 7 for engagement by arms 4 when the latter is rocked outward to move the shafts 6 outward, the arms 4 when rocked inward engaging and moving the shaft 6 also inward through flange K'.

The operation of the mechanisms thus far described is as follows:—As the parts are shown in the drawings they are in clamping position; i. e., the outer ends of levers 3 have been rocked outward from shaft A by the movement of sleeve H away from sleeve K, the short arms 4 of levers 3 being rocked inwardly toward flange K' and as thus rocked moving the shafts 6 inwardly through flange K' longitudinally of the axis of the clutch into the position shown in Fig. 2. While shafts 6 are being thus moved the nuts N traveling with them will rock the bell cranks J and move the shoes E, F in opposite directions toward and into frictional engagement with flange C. When the levers J have been thus moved the pulley B and shaft A will be clutched. To unclutch the pulley and shaft the sleeve H will be moved inwardly toward sleeve K, thereby restoring the long arms of levers 3 to horizontal position and rocking their short arms 4 outwardly from flange K'. As the arms 4 are thus moved they will, by their engagement with the pins 7 upon shafts 6, draw the latter outwardly through flange K', and the nuts N, moving with shafts 6, will rock the bell cranks J in the opposite direction to that just described and relieve the flange C from the pressure of shoes E, F and thus unclutch pulley B and shaft A.

The adjusting mechanism of the clutch illustrated in the drawings will now be described. This adjusting mechanism, like that of my Patent No. 483,370 consists of a plurality of pinions, a shaft 6 for each pinion and an intermediate I connecting the pinions G. The pinions G are connected to their shafts 6 so as to move therewith as the latter are moved by lever 3 and its arm 4, as just described, in clamping. The intermediate I connecting all of said pinions is journaled upon a shoulder i upon the inner face of flange K' and held from movement to and from said flange by bolts w in said shoulder entering a circumferential groove in the inner periphery of the intermediate. This adjusting mechanism is connected to the operating mechanism, i. e., nuts N, of the friction devices, by screw threads formed upon the shafts 6 and engaging corresponding threaded portions of the nuts N. The construction and operation of this adjusting mechanism is somewhat similar to that of my Patent No. 483,370 and the foregoing description of its construction and the following brief description of its operation will suffice for an understanding of the same.

Upon the rotation of any one of the pinions G, for example in the direction of the arrow Fig. 1, by hand or by means of the tightening mechanism presently to be described, the intermediate I will also be rotated and in turn rotate the other pinions G of the set. As the pinions G and with them their shafts 6 are thus rotated, the nuts N, threaded upon shafts 6 and held from rotation by their connection with bell cranks J, will move inwardly upon said shafts toward flange K'—the shafts 6 being held from movement longitudinally by arms 4 of levers 3,—and as the nuts N are thus moved they will, through bell cranks J draw shoes E inwardly and shoes F outwardly toward flange C, with the effect of increasing the friction between flange C and the shoes E, F, when operated by the tightening mechanism, or moving said shoes E F into such proximity to flange C, when operated by hand, as to secure increased friction between these surfaces upon the movement of sleeve H and levers 3 to clamping position. When it is desired to decrease the initial friction between the pressing surfaces of the clutch upon the operation of the shoes E, F by sleeve H and connections, one of the shafts 6 will be rotated in a direction opposite to that indicated by the arrow in Fig. 1, in which case the nuts N will travel outwardly upon their shafts 6 away from flange K'. The tightening mechanism with which this adjusting mechanism is preferably supplemented, for operating said adjusting mechanism when slip occurs between the two members of the clutch to increase the friction between said surfaces, will now be described. This tightening mechanism, which is substantially the same both as to construction and operation as that of my Patent No. 483,370, consists of a lever S pivoted upon one of the shafts 6, a pawl or pawls h upon the lever S, and a ratchet d keyed or otherwise connected to said shaft and engaged by said pawl or pawls. In the construction illustrated the ratchet d is provided with a squared interior fitting a correspondingly shaped portion of shaft 6. The lever S of this tightening mechanism extends inwardly toward shaft A into position for engagement by a cam or cams m upon the hub of pulley B. It may be held against the hub of pulley B and in the path of movement of cam or cams m by a spring or springs, as shown in my Patent No. 483,370, or in any other manner; devices also being provided, which are operated simultaneously with the movement to unclamping position of sleeve H, to throw said lever out of the path of movement of cam or cams m. As described in my prior patents this tightening mechanism will not be operated to increase the friction between the pressing surfaces of the clutch so long as no slip occurs between said surfaces. As soon, however, as such slip occurs, as it will under heavy load, the cam or cams m will engage the lever S and rock it outwardly from the hub of pulley B, the pawl or pawls h upon this movement of lever S rotating ratchet d and the pinion G upon whose shaft it is mounted. As the pinion G thus rotates it will, through intermediate I, as before described, rotate the other pinions G of the set, and, as also before described, operate bell cranks J to increase the friction between the pressing surfaces. This operation of the tightening mechanism will continue so long as slip exists. As soon as it ceases, the lever S and the cam or cams, rotating at the same speed, will not operate to further increase the friction.

In Fig. 3 I have shown an improved form of adjusting mechanism, over those of my two prior patents, for adjusting lever S out of operative position with relation to cam or cams m. This mechanism consists of latch L pivoted to the sleeve K and engaged at its outer end by a cam rod O pivoted to the sleeve H. To the inner end of latch L is pivoted a link t connected to the lever S. Upon the movement of sleeve H inwardly toward sleeve K to unclamping position, as before described, the rod O engaging the nose of latch L will move the same and with it its link t through an opening provided in flange K', thereby moving lever S out of the path of rotation of cam or cams m. This adjustment of lever S to inoperative position will preferably take place either simultaneously with or shortly before the disengagement of friction shoes E F from flange C.

A spring or other suitable device may be employed for returning lever S into the path of rotation of cams m upon the movement to clamping position of sleeve H, as shown in my Patent No. 483,370, or the lever may be returned positively to this position.

In the modification illustrated in Fig. 4, the construction and operation of the various mechanisms with the exception of the adjusting mechanism, are the same as those of the preceding figures. In the construction of this figure, however, but one pinion G, one shaft 6 and one nut N are employed. The pinion G of this figure gears with and rotates intermediate I which, in this figure, is provided with a shaft or hub I' on which is threaded the nut N, which is common to all the bell cranks J of this figure. The intermediate I is mounted upon sleeve K and is movable longitudinally thereof to and from the flange K' upon the movement to clamping and unclamping position, respectively, of the sleeve H.

The construction and operation of the levers 3 and their short arms 4 upon the movement of sleeve H outwardly from sleeve K is exactly the same as previously described in connection with the preceding figures, except that in the present case levers 3 and their arms 4 are pivoted to sleeve K, arms 4 engaging the face of the hub I', instead of, as in the preceding figures, the shafts 6.

The operation of the adjusting mechanism of this figure is as follows:—Upon the rotation of shaft 6 and its pinion G, in the direction of the arrow in Fig. 1, the intermediate I will, as in the preceding figures, also be rotated. As the intermediate is thus rotated, being held from movement away from flange K' longitudinally of the sleeve K by the arms 4, it will draw the nut N inwardly toward flange K', and, as in the case of the nuts N of the preceding figures, operate the bell cranks J to increase the friction between the pressing surfaces of the clutch, when the shaft is operated by the tightening mechanism or, when operated by hand, move said shoes into such proximity to flange C as to secure increased friction upon the movement to clamping position of sleeve H.

In the construction shown in Figs. 1 to 3, as well as that shown in Fig. 4, when it is desired to operate the adjusting mechanism by hand it will be necessary, or at least desirable, that the tightening and adjusting mechanism be disengaged. This may be done as described in my prior applications, or as shown herein, that is by the provision of nut n adapted to be screwed on the end of shaft 6, and movable to and from lever S, so that when said nut is unscrewed and moved outwardly from the face of lever S, said lever may move or be moved to such position as to take its pawls h out of engagement with the teeth of the ratchet d.

It is to be understood that so far as the present invention is concerned, the tightening and adjusting mechanisms may be modified without departing therefrom and any other suitable forms of such mechanisms be substituted for those shown and described; also that the tightening and adjusting mechanisms whether hand operated or operated from one member of the clutch, instead of operating through the usual connections actuated from a shifting mechanism, such as the sleeve H for shifting the friction mechanism to clutching and unclutching position, may operate through connections from which such shifting mechanism is omitted, or through connections specially provided for coaction solely with said tightening and adjusting mechanism; that the form of radially movable friction mechanism may be varied, if desired; that the term "driving member" includes not only a pulley as B, but also any other driving mechanism such as a shaft and that the means shown consisting of cams or projections m for operating the tightening mechanism may be modified and the number of such cams or projections also varied, if desired.

All such modifications and changes, which are referred to herein merely as examples of some modifications and changes which may be made in the apparatus, are, as well as others which may be made therein, included in the present invention.

It is to be understood that the expression

"operated by the driving member when the speed of the driven member is less than that of the driving member" as used herein in connection with the tightening mechanism is meant to include the operation of that mechanism when the driven member is in a state of rest.

It is also to be understood that the tightening and adjusting mechanism of the present invention may be used independently of each other and be combined with any other suitable form of adjusting and tightening mechanism respectively.

What is claimed is—

1. In a friction clutch the combination with friction mechanism movable radially of the clutch, of mechanism for operating said friction mechanism, mechanism for shifting said operating mechanism to clamping position, tightening mechanism upon one member and operated from the other member when the speed of the driven member is less than that of the driving member, and connections engaging said operating mechanism and operated by said tightening mechanism for moving said operating mechanism to increase the friction between the two members of the clutch, substantially as described.

2. In a friction clutch the combination with friction mechanism movable radially of the clutch, of mechanism movable longitudinally of the axis of the clutch for operating said friction mechanism, mechanism for shifting said operating mechanism to clamping position, tightening mechanism upon one member and operated from the other member when the speed of the driven member is less than that of the driving member, and connections engaging said operating mechanism and operated by said tightening mechanism for moving said operating mechanism to increase the friction between the two members of the clutch, substantially as described.

3. In a friction clutch the combination with a plurality of friction devices movable radially of the clutch, mechanism for simultaneously operating all of said friction devices, mechanism for shifting said operating mechanism to clamping position, tightening mechanism upon one member and operated from the other member when the speed of the driven member is less than that of the driving member, and connections engaging said operating mechanism and operated by said tightening mechanism for moving said operating mechanism to increase the friction between the two members of the clutch, substantially as described.

4. In a friction clutch the combination with a plurality of friction devices movable radially of the clutch, mechanism movable longitudinally of the axis of the clutch for simultaneously operating all of said friction devices, mechanism for shifting said operating mechanism to clamping position, tightening mechanism upon one member and operated from the other member when the speed of the driven member is less than that of the driving member, and connections engaging said operating mechanism and operated by said tightening mechanism for moving said operating mechanism to increase the friction between the two members of the clutch, substantially as described.

5. In a friction clutch the combination with friction mechanism movable radially of the clutch, of mechanism movable longitudinally of the axis of the clutch for operating said friction mechanism and friction adjusting mechanism connected to said operating mechanism for moving the latter to adjust the friction between the two members of the clutch, substantially as described.

6. In a friction clutch the combination with a plurality of friction devices movable radially of the clutch, of mechanism movable longitudinally of the axis of the clutch for simultaneously operating all of said friction mechanisms, and friction adjusting mechanism connected to said operating mechanism for moving the latter to adjust the friction between the two members of the clutch, substantially as described.

7. In a friction clutch the combination with friction mechanism movable radially of the clutch, of mechanism for operating said friction mechanism, a pinion and means for rotating said pinion and connections engaging said operating mechanism and operated by said pinion to adjust the friction between the two members of the clutch, substantially as described.

8. In a friction clutch the combination with friction mechanism movable radially of the clutch, of a pinion and shaft and means for rotating said pinion and shaft, a nut threaded on said shaft and movable thereon longitudinally of the axis of the clutch and connections between said nut and friction mechanism, substantially as described.

9. In a friction clutch the combination with a plurality of friction devices movable radially of the clutch, of a nut for each friction device, a shaft upon which said nut is threaded, a pinion for each shaft, gearing connecting all of said pinions for rotating the latter to simultaneously move all of said nuts and connections between said nuts and friction devices, substantially as described.

10. In a friction clutch the combination with a plurality of friction devices movable radially of the clutch, of a nut movable longitudinally of the axis of the clutch for each friction device, a shaft upon which said nut is threaded, a pinion for each shaft, gearing connecting all of said pinions for rotating the latter to simultaneously move all of said nuts, and connections between said nuts and friction devices, substantially as described.

11. In a friction clutch the combination with friction mechanism movable radially of the clutch, of pinions G, shafts 6 rotating with said pinions, nuts N movable longitudinally of the axis of the clutch threaded on said shafts, connections between said nuts and friction mechanism and gearing connecting all of said pinions, substantially as described.

12. In a friction clutch the combination with mechanism movable radially of the clutch and mechanism for operating said friction mechanism, of shaft 6 engaging said operating mechanism, means for rotating said shaft to move said operating mechanism to adjust the friction between the two members of the clutch, lever 3 provided with arm 4 for moving said shaft longitudinally and sleeve H and connections for rocking said lever, substantially as described.

13. In a friction clutch the combination with the lever S upon one member and operated from the other member and connections between said lever and the friction mechanism of the clutch for operating the latter, of latch L for throwing said lever out of operative position when moved longitudinally, sleeve H and connections between said sleeve and latch for moving the latter longitudinally and link t connecting said latch and lever, substantially as described.

14. In a clutch the combination with shoes E, F, of nuts N for operating said shoes, levers J connecting said nuts and shoes, shafts 6 supporting said nuts, sleeve H and connections between said sleeve and shafts 6 for moving the latter longitudinally of the axis of the clutch, substantially as described.

15. In a friction clutch the combination with shoes E, F, of nuts N for operating said shoes, levers J connecting said nuts and shoes, shafts 6 having a threaded connection with said nuts for moving the latter longitudinally of the axis of the clutch and means for rotating said shafts, substantially as described.

16. In a friction clutch the combination with shoes E, F, nuts N for operating said shoes, levers J connecting said nuts, shafts 6 having a threaded connection with said nuts for moving the latter longitudinally of the axis of the clutch, tightening mechanism upon one member of the clutch and operated from the other when the speed of the driven member is less than that of the driving member and connections between said tightening mechanism and shafts 6 for rotating the latter, substantially as described.

17. In a friction clutch the combination with shoes E, F, of nuts N for operating said shoes, levers J connecting said nuts and shoes, shafts 6 engaging said nuts, sleeve H and levers 3 connected to said sleeve and provided with arms 4 engaging said shaft, substantially as described.

In testimony whereof I have hereunto set my hand in the presence of two subscribing witnesses.

PETER WEBER.

Witnesses:
E. J. BERGGREN,
L. O. WEBER.